United States Patent [19]
Lindsey

[11] 3,889,860
[45] June 17, 1975

[54] FISHING GEAR CARRIER

[76] Inventor: Albert E. Lindsey, 12 Roberta Dr., Caseyville, Ill. 62269

[22] Filed: May 25, 1973

[21] Appl. No.: 363,891

[52] U.S. Cl. ............... 224/45 R; 224/45 Q; 224/5 E
[51] Int. Cl. .......................................... A45c 13/26
[58] Field of Search ............ 224/45 R, 45.15, 45 T, 224/47, 46, 5.6, 5.7, 5.8, 5.14, 5.3, 5.2, 7.11; 211/60 R, 113, 116, 124; 16/DIG. 40, DIG. 41

[56] References Cited
UNITED STATES PATENTS

| | | | |
|---|---|---|---|
| 1,185,698 | 6/1916 | Miller | 224/5 M |
| 1,564,101 | 12/1925 | Nakamura | 224/45 R |
| 1,719,695 | 7/1929 | Ferguson | 224/5 E |
| 1,815,673 | 7/1931 | Kelley | 224/45 T |
| 2,137,645 | 11/1938 | Doench | 224/5 E |
| 2,999,622 | 9/1961 | Durham | 224/45 R |
| 3,450,317 | 6/1969 | Ramer | 224/5 A |
| 3,482,747 | 12/1969 | Jones | 224/45 T |

Primary Examiner—Robert J. Spar
Assistant Examiner—Kenneth Noland
Attorney, Agent, or Firm—Paul M. Denk

[57] ABSTRACT

In a fishing gear carrier incorporating a rod member having a length sufficient to provide suspension of a variety of fishing accessories such as a tackle box, ice chest, minnow bucket, and the like, a pair of bracket means, being bracket like members, are provided at each end of said rod member to support and suspend some of the aforesaid items, and a variety of other attachments mainly comprising various forms of bent rod configurations may also be secured to said rod member for supporting various other smaller items of fishing accessories such as a fishing pole, combined rod and reel, bait pail, flashlight, and other miscellaneous fishing gear.

10 Claims, 10 Drawing Figures

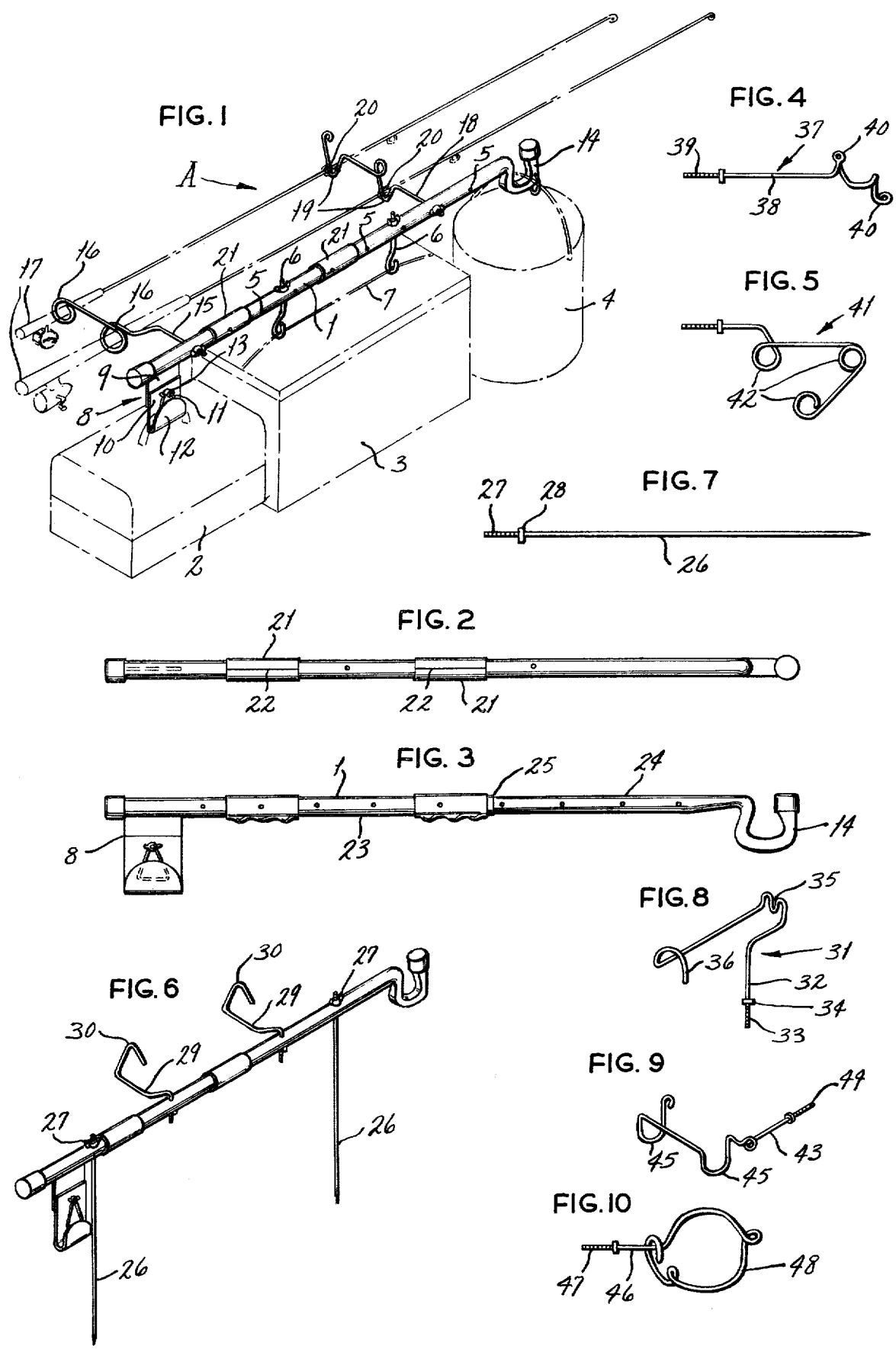

3,889,860

FISHING GEAR CARRIER

BACKGROUND OF THE INVENTION

This invention relates generally to fishing equipment, but more particularly, pertains to a carrier that is useful for supporting simultaneously a variety of fishing gear or accessories for facilitating their conveyance by the sportsman.

As any fisherman has experienced, while upon a fishing expedition, the most frustrating experience on any such trip involves the time consuming and burdening task of conveying each item of fishing gear to the fishing site, and back, generally necessitating a repeated number of trips between the cabin or car and the water before he can settle down to his more important piscatorial pursuits. To applicants knowledge, no one has attempted to ease this burden of the fisherman, with the exception, perhaps, of D. Durham, which, in his U.S. Pat. No. 2,999,622, describes a fishing rod holder for use in supporting a plurality of said rods while being carried. There appears to be a dearth of devices between the aforesaid item and a carrier for the pursued product, namely, for carrying a multitude of caught fish. The prior art only shows various carriers that may be used by only the most optimistic after he has caught his limit of fish. For example, fish carriers and conveying devices are shown in the U.S. Pat. Nos. to Montgomery, 3,302,837, and Martin 3,387,752.

In view of the forgoing, it is the principal object of this invention to provide a fishing gear carrier which may be adapted to provide support and conveyance of all of the fisherman's accessories at one time.

It is a further object of this invention to provide a fishing gear carrier which may be conveyed in one hand, thereby allowing the fisherman to transfer all of his gear in one facile operation, leaving his other hand free for carring other devices, for maneuvering, or for holding onto a rail as on a boat dock for the sake of safety.

It is an additional object of this invention to provide a fishing gear carrier which may simultaneously convey fishing rods, cane poles, minnow buckets, a tackle box, bait containers, an ice chest, and a variety of other equipment through the use of other various attachments or connecting devices that allow for quick suspension of such gear to the carrier.

It is a further object of this invention to provide a fishing gear carrier which may be manipulated along its length, either through its extension, or shifting of its hand grip, so as to allow for detection of its center of gravity for balancing the conveyed load.

It is a further object of this invention to provide a fishing gear carrier which can be used by the fisherman with comfort so as to enhance his enjoyment of the sport of fishing regardless of his success at making a catch.

It is an additional object of this invention to provide a carrier for fishing accessories and gear which is simple to manufacture, easily used, and which can be quickly set up for accommodating the specific items of equipment used by the individual fisherman.

Other objects will become more apparent to those skilled in the art upon reading the following summary and reviewing the description of the preferred embodiment in view of the drawing.

SUMMARY OF THE INVENTION

This invention incorporates a rod member which has a length designed to provide for the suspension along its length of various of the heavier items of fishing equipment such as the tackle box, ice chest, and minnow bucket. Various forms of brackets may be formed at either or both ends of this rod member, or where a singular bracket is provided at one end, the other end may be bent for bracket functioning purposes into a curve to provide for suspension of the handle of any container such as the minnow bucket normally employed by the fisherman. The rod member may be telescopically formed so as to provide for its extension or contraction as desired, depending upon the quantity of equipment being carried, or where said rod member is not formed in this manner, and is constructed integrally, then at least hand grips may be provided for longitudinal shifting along said rod so as to provide for ease of location of its center of gravity and balancing of the load to facilitate its transfer.

The rod member of this invention is further designed to have utility while at the fishing site wherein a pair of spiked like members may be connected to said rod member, with said spikes being inserted stably into the ground so as to arrange the said rod member horizontally, and through the use of one or more connecting means the fishing rods or poles in use may be angularly suspended in their operative position alleviating the need of the fisherman to personally retain the pole in hand while waiting for the fish to bite.

Various other attachments may be connected to the rod member, as when it is being prepared for loading with fishing gear incident to its transfer, and said attachments usually incorporate a form of rod or other projection which may be rigidly fastened at one end to said rod member, while the other end of said projection may be bent into the form of eyelets, loops, or half loops, so as to accommodate and firmly support fishing poles, rod and reels, flashlights, bait pails, or the like.

DESCRIPTION OF THE DRAWINGS

In the drawing, FIG. 1 provides an isometric view of the rod member of this invention incorporating its various attachments and brackets for use in supporting a variety of fishing gear, as during their conveyance;

FIG. 2 provides a top view of just the rod member of the fishing gear carrier shown in FIG. 1;

FIG. 3 provides a side view of the rod member alone as disclosed in FIG. 1, also showing a modification in its construction to allow for its telescopically expanding or contracting as may be desired;

FIG. 4 provides a side view of an attachment for connecting to the rod member and useful for supporting one or more fishing poles during their conveyance;

FIG. 5 provides a side view of an attachment capable of securement to the rod member and useful for supporting at least three fishing rods and reels as during their conveyance;

FIG. 6 discloses the rod member of this invention being suspended horizontally by means of a pair of spike members, and including a pair of attachment means which may support fishing poles or rods as during use;

FIG. 7 provides a view of one of the spike members disclosed supporting the rod member in FIG. 6;

FIG. 8 provides an isometric view of an attachment which may be fixed to the rod member and support a fishing rod as during its usage while fishing;

FIG. 9 provides an isometric view of another attachment that may be connected to the rod member and useful for supporting a flashlight as during its conveyance; and FIG. 10 provides a plan view of an attachment means capable of being fixed to the rod member, said means being useful for supporting a bait pail as during its conveyance.

DESCRIPTION OF THE PREFERRED EMBODIMENT

In the drawing, and in particular referring to FIG. 1, there is disclosed a view of the fishing gear carrier A of this invention comprising a rod member 1 which is shown having a length sufficient to accommodate the lineal attachment and suspension therefrom of a variety of fishing gear and accessories, such as a tackle box 2, ice chest 3, and minnow bucket 4. The rod member is disclosed as having a series of apertures, as at 5, provided therethrough, either arranged horizontally or vertically through the rod member, and connecting through said apertures and to the rod member may be any variety of attachment means, such as the hooks 6 as shown, which in this particular instance, are useful for holding the strap 7 of the ice chest 3 providing for its suspension as during conveyance.

Provided proximate the back end of the rod member 1 is a bracket 8, which comprises an upper portion 9 which is rigidly fixed to the rod member, while pivotally mounted to the downward edge of said upper portion is a lower portion 10 and a locking means 11. The lower portion 10 includes a turned up end 12 into which, for example, the handle of the tackle box 2 may be inserted and suspended, with the locking means 11 being pivoted downwardly, locked in place by means of a wing nut, as at 13, thereby embracing and retaining the tackle box handle firmly within the bracket 8, as during its conveyance.

Provided proximate the front end of the rod member 1 is an integral bend, as at 14, said bend preferably being somewhat conic in shape, so as to allow for the centering and suspension of the handle of any item of fishing equipment, such as the minnow bucket 4, thereby facilitating the transfer of this item as during conveyance of the gear ladened rod member.

Further attaching to the rod member 1 are various other attachments, such as the projecting rod 15 which is rigidly fastened at one end to said rod member, and extends laterally having a pair of integrally formed loops 16 provided therein which are useful for accommodating the insertion of the handle portion of a fishing rod or reel, such as the combined rods and reels 17 as shown, to facilitate their conveyance. Providing support for the forward portions of said rods and reels is another attaching means 18, comprising a projection which is rigidly, but removably, connected by means of a wing nut to the rod member 1, extending laterally therefrom, and also formed having a pair of integral bends, such as the inverted loops 19 as shown therein, to provide for support of the forward portions of the fishing rods 17, as aforesaid. An elastic band, as at 20, may be provided at each loop 19, being useful for tightly embracing the fishing rods at this location so as to insure their retention as during conveyance of the gear ladened fishing carrier.

Also provided upon the rod member 1 are one or more hand grips 21, which provide for ease of grasping of the rod member at that location predetermined to provide the approximate center of gravity of the gear ladened carrier, thereby insuring that when the rod member is picked up at this location, it will be properly balanced. As can be seen from FIG. 2, these hand grips 21 are provided with a longitudinal slit, as at 22, along their length, thereby providing for their easy removal, or for sliding along the length of the rod member, to provide for their prompt relocation, when necessary for balancing the loaded carrier.

By referring to FIG. 3, it can be seen that the rod member 1 is essentially designed having a bracket 8 provided at one end, with an integral bend 14 provided at the other end, but it is just as likely that the type of bracket 8 may be provided at either end of the rod member, or for that matter, either end of said rod member may be provided with a bracketed bend, as shown at 14, depending upon the style of rod member desired by the fisherman. In addition, and to provide for further ease of adjustment of the weight along the length of the rod member, the rod member may be composed of two telescoping parts, having a back portion 23 into which a front portion 24 may insert, as at 25, or vice versa, to provide for extension or contraction of said rod member.

A further use of the rod member 1 of this invention is disclosed in FIG. 6, wherein a pair of spike like members 26 may be connected, as by means of the wing nuts 27, at spaced locations upon said rod member, and said spikes may be embedded firmly into the ground to provide for a horizontal disposition of said rod member and for use in supporting fishing rods or poles as during fishing. As shown in FIG. 7, said spike like members 26 contain a threaded end 27, upon which the wing nuts may fasten after said end has been inserted through the rod member 1, and comes to rest against the shoulder 28, and rigidly held thereagainst by means of the tightening of a wing nut.

To facilitate the retention of the fishing rods or poles upon the horizontally disposed rod member 1, such as shown in FIG. 6, a pair of attachments, as at 29, each capable of holding one rod, are rigidly fastened to and through the respective apertures provided in the rod member, and each attachment is provided with a projection directed upwardly and laterally of the rod member, having an integral inverted bend, or half loop, provided at its back end 30, as shown. Hence, the rear end of the handle of a fishing rod may be embraced or confined within this inverted bend 30, while the frontal portion of the fishing rod handle rests against either the projection 29 or the rod member 1, thereby suspending the fishing rod angularly upwardly and directed out and over the body of water into which the fishing line may have been cast. As any fisherman well knows, it is desirable to maintain a fishing rod in this angular position so that one may detect movement of the tip of the rod as when a fish is nibbling or has taken the bait.

An alternative type of attaching means is shown at 30 as disclosed at FIG. 8. This means also comprises a device for holding a fishing rod in place after a line has been cast or located in the water. This attachment 31 comprises a rod 32 which at one end 33 is threaded, including a shoulder 34, and can be inserted through an aperture of the rod member 1, and fastened thereto by means of a wing nut. The other end of the rod 32 is bent into a somewhat upright half loop 35, and then further extends rearwardly for a distance and is formed into another inverted half loop 36 which is arranged somewhat in line with the aforesaid loop 35. Hence, when this means 31 is attached through an aperture of the horizontally disposed rod member 1, as shown in FIG. 6, and replaces the attachment 30, it also provides a means for suspending a fishing pole, or rod and reel, after its line has been cast or located in the water while waiting for the fish to bite. The rear handle portion of the fishing rod will be embraced under the half loop 36, while the frontal portion of the handle, or part of the fishing rod itself, will be cradled within the half loop 35.

Various other forms of connecting means that may be used in lieu of the means 15 and 18 previously described, and such are shown in FIGS. 4, 5, 9 and 10. In FIG. 4, this attachment 37 also includes a projecting portion or rod 38 which at one end 39 is threaded, providing for its attachment to an aperture of the rod member 1 as previously described. The projection 38 extends preferably laterally of the rod member, and is formed having a pair of eyelets 40 through which elastic, such as of plastic or rubber, rings may insert and function to retain a pair of fishing poles in place, as when the rod member 1 is ladened with accessories for conveyance.

An additional attachment is shown in FIG. 5, and functions quite similarly to the attachment 15 disclosed in FIG. 1, with the exception that this attachment incorporates three loops 42 that may hold a like member of fishing rods or poles in place as while being conveyed during operation of the rod member 1.

Another form of attachment is disclosed in FIG. 9, and in this particular instance, the attachment may be used for holding a flashlight during conveyance. This attachment also includes a projection or rod like member 43 which is threaded at one end, as at 44, and is bent to form a pair of aligned half loops 45 which are spaced apart a distance less than the length of a flashlight, and a flashlight may be cradled within these loops 45 and held in place while the rod member 1 is being carried. Obviously, the threaded end 44 may insert through an aperture 5 of the rod member 1 and be rigidly held in place by means of a wing nut to rigidly secure it to the carrier.

Another attachment is disclosed in FIG. 10, and in this particular instance it comprises a means for holding a bait pail to the rod member 1 during transfer. This device includes a projection 46 which is threaded at one end 47, and which is formed at its other end into closed loop 48 having a circumference slightly greater than the circumference of the standard bait pail, but less than the lip of such a pail so that said pail may insert within the loop and be suspended while carried.

The variety of attachments previously disclosed are useful for supporting most of the types of fishing accessories commonly used by the sportsman. Obviously other modifications may be made to the various attachments disclosed herein, such modifications as may be within the purview of one skilled in the art upon reviewing the subject matter of this invention. The described embodiments are presented to illustrate the principle of this invention, and these embodiments, in addition to any equivalent designs, are intended to be encompassed within the patent protection to issue thereupon.

Having thus described the invention, what is claimed and desired to be secured by Letters Patent is:

1. In a fishing gear carrier of the type providing for conveyance of a plurality of items of fishing accessories such as a tackle box, bait bucket, fishing rod, and the like, comprising, a rod member having a length to provide for accommodating the suspension of such gear along its length, a bracket means provided at each end of said rod member for supporting such gear, said rod member capable of accepting additional attachment means along its length for supporting other of said fishing accessories, bracket means at least at one end including an upper portion being secured to said rod member, a lower portion of said bracket having a turned up end and being connected to said upper portion, locking means pivotally connecting with said lower portion of the bracket, said locking means provided for securing an item of fishing gear within the turned up end of the lower portion during accessory conveyance and including attachment means for supporting at least one fishing rod upon said rod member during its conveyance, said means comprising a pair of rods extending laterally from said rod member, each projecting rod having at least one loop formed therein whereby said fishing rod may be coupled adjacent to said loops and supported during conveyance of the gear carrier.

2. The invention of claim 1 and further including at least one hand grip provided upon said rod member to facilitate the grasping and retaining of said accessory laden carrier, said grip having a slit along its length to provide for its shifting and relocation along the length of said rod member to achieve balancing of the weight of the conveyed fishing accessories.

3. The invention of claim 1 and including means for mounting the rod member to the ground, said means comprising a pair of spike means being fastened at one end and at spaced locations to said rod member, said spike means extending from said rod member in the same direction towards the ground, the downward ends of said spike means provided for insertion into the ground and thereby stably disposing said rod member horizontally for supporting various of said fishing accessories.

4. The invention of claim 1 and including attachment means for supporting at least one fishing pole upon said rod member during its conveyance, said means comprising a pair of rods projecting laterally from said rod member, each rod having at least one eyelet formed therein, an elastic member coupled to each eyelet and provided for embracing and retaining the said fishing pole during conveyance of said gear carrier.

5. The invention of claim 1 and including attachment means for supporting at least one flashlight upon said rod member during its conveyance, said means comprising a rod connecting to said rod member, said rod being bent forming a pair of aligned and spaced apart half loops disposed opening upwardly and provided for supporting a flashlight as during conveyance of said gear carrier.

6. The invention of claim 1 and including an attachment means for supporting at least one bait pail upon said rod member during its conveyance, said means comprising a rod projecting from said rod member, said rod being bent to form a horizontally disposed loop, the end of said loop being turned for securement around the portion of said rod extending from said rod member, whereby said bait pail may be inserted within said formed loop and supported as during conveyance of said gear carrier.

7. The invention of claim 3 and including attachment means for supporting at least one fishing rod during its usage upon said horizontally disposed rod member, said means comprising a rod connecting to said rod member at one end and extending laterally therefrom, said rod proximate its other end being bent to form an inverted half loop wherein the handle end of said fishing rod may be embraced to stabilize the retention of said fishing rod during its usage.

8. The invention of claim 3 and including an attachment means for supporting at least one fishing rod during usage upon said horizontally disposed rod member, said means comprising a rod connecting at one end to said rod member and extending vertically therefrom, said rod being bent to form an upright half loop, and said rod being further bent to form an inverted half loop a spaced distance from said first bent half loop, whereby the fishing rod may be stabilized and confined within said pair of aligned half loops as during its usage.

9. The invention of claim 1 wherein said lower portion of the bracket also pivotally mounts to the upper portion of said bracket.

10. The invention of claim 1 wherein the bracket means at the other end of said rod member comprises an integrally curved bent portion upon which an item of fishing accessory may be suspended as during its conveyance.

* * * * *